United States Patent
Henzler et al.

(10) Patent No.: US 12,442,377 B2
(45) Date of Patent: Oct. 14, 2025

(54) PROCESS AND APPARATUS FOR COMPRESSING HYDROGEN GAS IN A HYBRID COMPRESSION SYSTEM

(71) Applicant: Air Products and Chemicals, Inc., Allentown, PA (US)

(72) Inventors: Gregory W. Henzler, Emmaus, PA (US); Nicolas John Haryett, Surrey (GB); Ghassan Altimany, North Wales, PA (US); Patrick J. Smith, Schnecksville, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 396 days.

(21) Appl. No.: 17/346,825

(22) Filed: Jun. 14, 2021

(65) Prior Publication Data
US 2022/0397118 A1     Dec. 15, 2022

(51) Int. Cl.
F04D 27/00     (2006.01)
C25B 1/04      (2021.01)
(Continued)

(52) U.S. Cl.
CPC ............ F04D 17/12 (2013.01); C25B 1/04 (2013.01); F04D 25/06 (2013.01); F04D 25/16 (2013.01);
(Continued)

(58) Field of Classification Search
CPC .......... F04D 17/06; F04D 17/08; F04D 17/10; F04D 17/12; F04D 25/06; F04D 25/16;
(Continued)

(56) References Cited

U.S. PATENT DOCUMENTS

| | | | | |
|---|---|---|---|---|
| 2,849,379 A | * | 8/1958 | Hengstebeck | C10G 35/14 |
| | | | | 422/607 |
| 3,801,708 A | * | 4/1974 | Smith | C10K 1/165 |
| | | | | 423/655 |

(Continued)

FOREIGN PATENT DOCUMENTS

| CN | 108599245 A | 9/2018 |
|---|---|---|
| CN | 211040479 | 7/2020 |

(Continued)

OTHER PUBLICATIONS

Andrzej Witkowski, Andrzej Rusin, Miroslaw Majkut, Katarzyna Stolecka "Comprehensive analysis of hydrogen compression and pipeline transportation" 2017; Elsevier, pp. 2508-2518 (Year: 2017).*

(Continued)

*Primary Examiner* — Michael J Tsai
*Assistant Examiner* — Charles W Nichols
(74) *Attorney, Agent, or Firm* — Matthew R. Weaver

(57) ABSTRACT

A stable discharge pressure of compressed hydrogen gas generated from the electrolysis of water is achieved and maintained at the outlet of a "hybrid" multistage compression system comprising at least a first section comprising at least one centrifugal compressor powered at least in part by electricity generated from at least one renewable energy source and a further section downstream of the first section, wherein the further section comprises at least one reciprocating compressor.

19 Claims, 1 Drawing Sheet

(51) Int. Cl.
  *F04D 17/12* (2006.01)
  *F04D 25/04* (2006.01)
  *F04D 25/06* (2006.01)
  *F04D 25/16* (2006.01)
  *F04D 27/02* (2006.01)
  *F04D 29/58* (2006.01)

(52) U.S. Cl.
  CPC ..... *F04D 27/0269* (2013.01); *F04D 29/5833* (2013.01)

(58) Field of Classification Search
  CPC ............... F04D 27/005; F04D 27/0269; F04D 27/0292; F04D 29/5833; C25B 1/04
  See application file for complete search history.

(56) References Cited

U.S. PATENT DOCUMENTS

| | | | |
|---|---|---|---|
| 5,743,715 A | 4/1998 | Staroselsky et al. | |
| 7,444,189 B1* | 10/2008 | Marhoefer | H01M 8/0612 700/291 |
| 10,634,425 B2* | 4/2020 | Guillard | F25J 1/0232 |
| 2003/0175564 A1 | 9/2003 | Mitlitsky et al. | |
| 2004/0255615 A1 | 12/2004 | Hupkes et al. | |
| 2005/0210914 A1* | 9/2005 | Allam | F25J 1/0067 62/607 |
| 2006/0207178 A1* | 9/2006 | Hsu | H01M 8/04208 48/127.9 |
| 2008/0005964 A1* | 1/2008 | Hajiaghajani | C01B 3/501 48/61 |
| 2008/0236396 A1* | 10/2008 | Moulthrop | C01B 3/56 96/134 |
| 2010/0280135 A1* | 11/2010 | Doty | C01B 3/36 518/703 |
| 2012/0100062 A1* | 4/2012 | Nakamura | C01B 3/063 252/375 |
| 2013/0177393 A1 | 7/2013 | Sishtla | |
| 2014/0079593 A1 | 3/2014 | Naito et al. | |
| 2017/0122129 A1 | 5/2017 | Heid et al. | |
| 2017/0145915 A1 | 5/2017 | Heid et al. | |
| 2017/0317502 A1 | 11/2017 | Ito | |
| 2019/0010949 A1* | 1/2019 | Swindlehurst | F04D 27/0261 |
| 2019/0277448 A1* | 9/2019 | Krogsgaard | F17C 5/06 |

FOREIGN PATENT DOCUMENTS

| | | |
|---|---|---|
| CN | 112086960 A | 12/2020 |
| CN | 119887199 A | 4/2025 |
| JP | 2018135551 A * | 8/2018 |
| JP | 2018135551 A2 | 8/2018 |
| JP | 2018207728 A | 12/2018 |
| RU | 2753754 C1 | 8/2021 |
| WO | 2016170700 A1 | 10/2016 |

OTHER PUBLICATIONS

Witkowski, Andrzej et al; Comprehensive analysis of hydrogen compression and pipeline transportation from thermodynamics and safety aspects, Energy, Elsevier, Amsterdam, NL vol. 141, May 26, 2017, pp. 2508-2518.

"K-GreeN-Digital-Solutions", Kellogg, Brown & Root LLC; Jan. 2021, 17 pgs.

Ogden, Joan M.; "Prospected for Building a Hydrogen Energy Infrastructure"; Au Rev. Energy Environ. 1999; 24:227-79 Copyright 1999 by Annual Reviews.

* cited by examiner

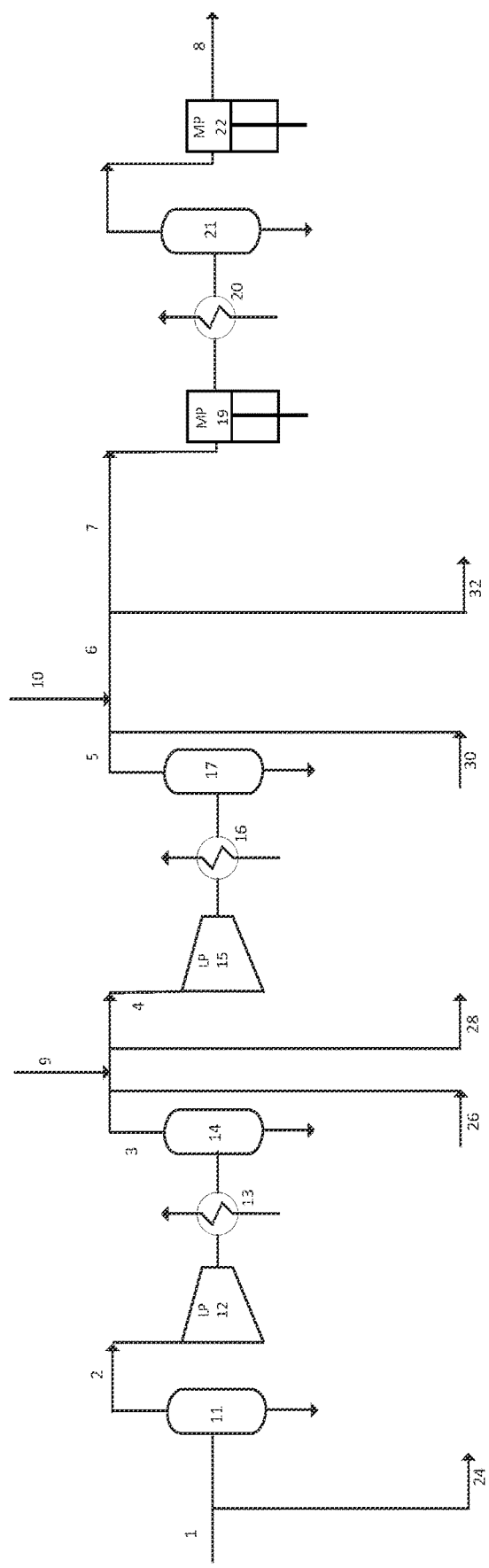

PROCESS AND APPARATUS FOR COMPRESSING HYDROGEN GAS IN A HYBRID COMPRESSION SYSTEM

TECHNICAL FIELD

The present invention relates to the compression of hydrogen gas produced by electrolysis in the context of renewable energy (i.e. "green" hydrogen). The present invention is particularly concerned with ways to achieve and maintain a stable discharge pressure at the outlet of a multistage compression system whereby said system is powered at least in part by electricity generated from at least one renewable energy source.

BACKGROUND

Typically, downstream processes which consume compressed hydrogen are powered entirely by electricity generated from a conventional energy source such as onsite petrol-, diesel- or hydrogen-powered generator(s), fuel cells, or taken from a local or national grid, or combinations of these sources. In such instances, the downstream processes are run at maximum capacity in order to produce the highest possible yield of product(s).

However, downstream processes which are powered by electricity generated by one or more renewable energy source(s) may involve equipment which is ramped up or down to accommodate the changes in availability of power from said renewable energy source(s).

As such, downstream process(es) may be simplified by being configured in such a way that there are strict tolerances regarding the variation in the feed pressure of the hydrogen gas being fed to said downstream process(es). It is also generally preferred that hydrogen gas is supplied at a stable feed pressure to simplify operation of the downstream process(es). The present inventors have therefore identified that a multistage compression system is desired which produces compressed hydrogen gas with a stable discharge pressure that is to be fed to said downstream process(es), which is also capable of being powered by electricity generated by a renewable energy source, and of compressing large amounts of hydrogen gas produced by electrolysis in a cost-effective and space-efficient manner.

Further, in this context it will be envisaged that other steps of the overall process such as those associated with hydrogen production (e.g. electrolysis) may also be powered by a renewable energy source and so a multistage compression system is desired which operates effectively with a system designed to accommodate changes in the levels of hydrogen gas produced.

CN211040479 U is a document relating to dry hydrogen compression in an oil refinery. This document discloses combinations of various type of compression, including centrifugal and positive-displacement compressors arranged in series and/or in parallel.

At present, the inventors are not aware of any prior art which addresses the above-mentioned issues in the context of compressing of wet hydrogen gas produced by electrolysis and in the context of a renewable energy source.

DETAILED DESCRIPTION OF THE INVENTION

Process

According to a first aspect of the present invention, there is provided a process for supplying hydrogen for consumption in at least one downstream process, said process comprising:

producing hydrogen gas by electrolysis of water;
compressing said hydrogen gas in a multistage compression system comprising a first section and a further section downstream of said first section to produce compressed hydrogen gas; and
feeding said compressed hydrogen gas to said downstream process(es), wherein said first section of said multistage compression system comprises at least one centrifugal compressor powered by electricity generated at least in part from at least one renewable energy source, the or each centrifugal compressor being driven by a dedicated variable frequency drive, and wherein said further section of said multistage compression system comprises at least one reciprocating compressor.

In the following discussion of embodiments of the present invention, the pressures given are absolute pressures unless otherwise stated.

Positive-displacement compressors, such as reciprocating compressors, are typically used in industrial processes to compress hydrogen gas. This type of compressor works by confining successive volumes of gas within a closed space, such as by using a piston driven by a crankshaft to deliver gases at high pressure.

The performance of positive-displacement compressors, such as reciprocating compressors, is typically uniform for gaseous media of both a very low molecular weight and a high molecular weight. This type of compressor is therefore suitable for a range of gases and, in particular, is suitable for the compression of hydrogen gas. As a result, positive-displacement compressors, such as reciprocating compressors, are ubiquitous in incumbent industrial processes for compressing hydrogen gas.

However, these types of compressors are not preferred for handling large volumes of gas. In order to do so, a large number of compressors must be used in parallel due to the structure of these types of compressors. This results in considerable capital expense and operating costs.

An alternative to positive-displacement compression is centrifugal compression. Centrifugal compressors are a type of dynamic compressor, in which gas is compressed by mechanical action of rotating vanes or impellers which impart velocity to the gas. Gas typically enters at the center of the impellers and is propelled out to the radial edges under rotary motion to deliver gases at high velocity which impact the casing. The velocity of the gas is converted to a static pressure to deliver high pressure gases. These types of compressors are typically more suited to handling large volumes of gases at lower costs.

However, these compressors are typically not suitable for compressing low molecular weight gases, such as hydrogen. This is because it is more difficult to establish sufficient centrifugal force due to the lower density of the gas, making high-pressure compression more difficult. Typically, in order to compress a low molecular weight gas in a centrifugal compression system, such a system must be designed with many more impellers in series to accommodate the reduced gas density. This design substantially increases the cost of the compression system and is undesirable due to the inherent mechanical constraints of such a system.

Moreover, for centrifugal compression the pressure ratio (the discharge pressure divided by the inlet pressure, for a particular stage of compression) is highly sensitive to, and dependent upon, the molecular weight of the gas being compressed. Accordingly, variations in molecular weight of a gas may result in a discharge pressure which is lower than intended.

This is particularly an issue when compressing gases which are "wet" i.e. contain water vapour, such as hydrogen which has been produced by the electrolysis of water. Wet hydrogen gas will have an apparent molecular weight which is initially higher than dry hydrogen gas, and this molecular weight will decrease as the water vapour is removed, for example due to cooling or purification.

Thus, the removal of water vapour from hydrogen gas produced by electrolysis may in turn may lead to a reduced discharge pressure. The inventors have found that this issue is particularly prevalent in a system where compressed hydrogen gas is cooled and recycled around a stage of compression or cooled and/or purified then fed to a stage of compression from storage.

The performance of centrifugal compressors is also susceptible to changes in electrical frequency. In particular, the electrical output from a renewable energy source will operate at a set electrical frequency which may be inherently variable, e.g. the electrical frequency may be 60 Hz but vary from about 57.0 to 62.5 Hz during operation. This change in frequency will be reflected in the motor speed of the impellers of a centrifugal compressor, and in turn, the discharge pressure, which is proportional to the square of the motor speed change ratio.

By way of an example, in a multistage compression system with only centrifugal compression, a drop in electrical frequency from 60 to 58 Hz would reduce compressor flow to ~96.7% and discharge pressure from 30 to ~28 bar. Thus, variations in electrical frequency may result in a discharge pressure which is lower than the desired feed pressure for a downstream process. This is not ideal where a downstream process requires a stable feed pressure.

Therefore, it can be seen that centrifugal compression is an unlikely candidate for compression of hydrogen gas produced by electrolysis and powered by electricity generated from a renewable energy source.

Nonetheless, the present inventors have devised herein a multistage compression system which utilizes the respective benefits of each of these two types of compression, whilst simultaneously mitigating their respective drawbacks, as explained in more detail below.

The present invention relates to a process for supplying hydrogen for consumption in at least one downstream process.

Electrolysis

Hydrogen gas is generated in the present invention by the electrolysis of water. Any suitable form of water electrolysis may be used including alkaline water electrolysis and polymer electrolyte membrane (PEM) water electrolysis.

The water used for the electrolysis is typically sea water that has been desalinated, possibly by reverse osmosis, and demineralized.

The electricity required for electrolysis may be generated from any suitable energy source. In some preferred embodiments however, at least some of the electricity required for the electrolysis is generated from a renewable energy source including wind energy, solar energy, tidal energy and hydroelectric energy, or combinations of these sources, particularly wind energy and solar energy. The electricity generated from these sources may be used to provide power to the electrolysers.

Preferably, the process will be self-contained in terms of power generation for the electrolysis. Thus, preferably the entire electricity demand for the electrolysis is met using renewable power sources.

It is envisaged, however, that electricity generated from one or more renewable energy sources may be supplemented by other sources either during periods of particularly high demand for product(s) from the downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid.

The electrolysis may be carried out at any suitable scale, in some instances with a total capacity of less than 1 gigawatt (GW). However, in preferred embodiments the electrolysis has a total capacity of at least 1 gigawatt (GW). In some embodiments, the electrolysis has a capacity of at least 300 MW, e.g. at least 400 MW, per centrifugal compressor. The maximum total capacity of the electrolysis is limited only by practical considerations, e.g. generating sufficient power from the renewable energy sources to power the plurality of electrolysers. Thus, the electrolysis may have a maximum total capacity of about 10 GW or more. The total capacity of the electrolysis may be from 1 GW to about 5 GW, e.g. from about 1.5 GW to about 3 GW, for example.

The hydrogen gas is typically generated by the electrolysis at pressure slightly higher than atmospheric pressure, e.g. about 1.3 bar. However, in some embodiments, the electrolysis produces hydrogen at a somewhat higher pressure, for example up to about 3 bar.

Thus, hydrogen gas is usually fed to the multistage compression system at a pressure in the range from atmospheric pressure to about 3 bar, preferably in the range from atmospheric pressure to about 1.5 bar, e.g. about 1.1 bar.

In some embodiments, the amount of hydrogen gas produced by the electrolysers is variable and so during periods where there is insufficient hydrogen gas produced by electrolysis, hydrogen gas may be fed to the multistage compression system from another source, e.g. a hydrogen storage system as explained below.

Purification

It will be appreciated that hydrogen gas produced from electrolysis of water will contain impurities. Therefore, the term "hydrogen gas" when used in the context of the present invention is intended to refer to hydrogen gas with such impurities, unless and until the hydrogen gas is purified.

In particular, this term includes hydrogen gas produced by electrolysis which is typically saturated with water at 40° C. and usually contains some residual oxygen gas, typically about 500 to about 1000 ppm(v). These impurities will usually have to be removed, depending on the tolerances of any downstream process(es).

For example, oxygen is a poison for conventional catalysts used in the Haber process. Thus, if the compressed hydrogen gas is intended to be used in a downstream process that is ammonia synthesis, the feed to the catalyst will contain less than about 10 ppm, typically less than about 5 ppm, total oxygen, i.e. oxygen atoms from any impurity source such as oxygen gas ($O_2$), water ($H_2O$), carbon monoxide (CO) and/or carbon dioxide ($CO_2$). Accordingly, the feed will also be dry, i.e. no more than 1 ppm water. Downstream processes using conventional "grey" hydrogen (i.e. hydrogen derived from a hydrocarbon or carbonaceous feed stream without capture of carbon dioxide, e.g. by reforming natural gas), or "blue" hydrogen (i.e. hydrogen derived in the same way as "grey" hydrogen but where some or all of the carbon dioxide associated with production is captured), such as refineries, have similar tolerances for oxygen and water.

In some embodiments, the compressed hydrogen gas may be purified upstream of being fed to a downstream process.

For example, the residual oxygen gas in the compressed hydrogen gas may be converted into water by catalytic combustion of some of the hydrogen to produce oxygen-depleted compressed hydrogen gas (containing no more than 1 ppm $O_2$) which may then be dried to produce dry compressed hydrogen gas (containing no more than 1 ppm water) for use in a downstream process(es).

Hybrid Compression System

The process of the present invention comprises a step of compressing the hydrogen gas in a multistage compression system comprising a first section and a further section downstream of said first section to produce compressed hydrogen gas.

The multistage compression system is a hybrid system, responsible for compressing hydrogen gas from the pressure at which the hydrogen gas is generated by electrolysis to an elevated pressure that is generally at least little higher than the feed pressure of the downstream process.

The term "hybrid system" as used herein means a system which uses a combination of centrifugal compression in a first section and reciprocating compression in a further section downstream of said first section.

As will be readily appreciated, a "multistage" compression system has a plurality of stages of compression that may be split between compressors in parallel and/or in series. The overall pressure ratio across each stage is generally in the range of about 1.5 to about 2.5, e.g. about 2 to about 2.5, in order to limit the increase in temperature of the compressed gas. In some embodiments the multistage compression system comprises from one to eight stages, preferably one to three stages, e.g. two stages of compression.

Coolers are typically required between adjacent stages ("inter-coolers") and typically required after a final stage ("after-coolers") in multistage compression systems to remove heat of compression from compressed gas. Thus, in the context of the present invention, a "stage" of compression refers to the part of the compression system between coolers.

The multistage compression system comprises at least two compression sections, a first section and a further section downstream of said first section. A "section" of compression in this context refers to the part of the compression system between feeds and products. Each section may comprise one or more stages of compression, together with the associated coolers.

The hydrogen gas is compressed in at least two sections of the multistage compression system. In a first section hydrogen gas is compressed to a first elevated pressure. Then, in the further section compressed hydrogen gas is compressed to a final elevated pressure.

In some preferred embodiments, the multistage compression system has two sections, and in the first section hydrogen gas is compressed to the first elevated pressure, and in the second section compressed hydrogen gas is further compressed to the final elevated pressure.

The final elevated pressure is preferably no less than 5%, more preferably no less than 2% of the desired feed pressure for the downstream process(es). The final elevated pressure may sometimes be higher than the desired feed pressure.

Any suitable number of compressors may be used in the context of the present invention. It will be appreciated that the total number of compressors depends on the design of the overall system, and in particular the electrolysers total capacity. By way of example, for a process having a total electrolyser capacity of 1 GW, the multistage compression system may have from 2 to 4 compressors. The skilled person would appreciate that a process having a higher total capacity would require a greater number of compressors, i.e. 8 compressors in a multistage compression system for a process having a total electrolyser capacity of 2GW.

In some instances hereinafter, the first section may be referred to as a "low pressure" or "LP" section, and the further section may be referred to as a "medium pressure" or "MP" section.

Compressors in the first section may be oversized as appropriate, e.g. by 10%, to accommodate the loss of a machine. Additionally or alternatively, the multistage compression system may comprise a spare compressor in either the first or the further section which would cut-in to replace another machine in the relevant section that had broken down.

In the context of the present invention, at least some electricity for said compression of hydrogen gas in the multistage compression system is generated from at least one renewable energy source.

Suitable renewable energy sources include wind energy, solar energy, tidal energy and hydroelectric energy, or combinations of these sources, particularly wind energy and solar energy.

Preferably, the process will be self-contained in terms of power generation for the compressor(s). Thus, the entire electricity demand for the compressor(s) in the multistage compression system is ideally met using renewable energy sources.

It is envisaged, however, that electricity generated from one or more renewable energy sources may be supplemented by other sources either during periods of particularly high demand for product(s) from the downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid. However, it will be appreciated that supplementing electricity from non-renewable sources is minimized or avoided completely if possible.

The electricity generated from the renewable energy source(s) is used to power the compressor(s) in the first section of the multistage compression system, and preferably also the compressor(s) in the further section.

First Section of Compression

In the context of the present invention, the "first section" may refer either to an initial section, or an intermediate section, so long as it is upstream of, and in fluid communication with, the further section located downstream thereof. However, in preferred embodiments the first section is an initial section of the multistage compression system.

In some embodiments, the first elevated pressure of the hydrogen gas after compression in the first section may be in the range of about 2 bar to about 3 bar, e.g. 2.5 bar. In other embodiments, the first elevated pressure may be in the range of about 4 bar to about 6 bar, e.g. 5 bar.

The first section of the multistage compression system according to the present invention comprises at least one centrifugal compressor. In preferred embodiments, all of the compressors in the first section are centrifugal compressors.

In some embodiments, the first section comprises a plurality of centrifugal compressors arranged in parallel. As will be appreciated by the skilled person, the number of compressors will depend on the scale of the process. By way of example, the first section may comprise from 2 to 10, or from 4 to 6 centrifugal compressors arranged in parallel.

By using a centrifugal compressor in the first section of the multistage compression system, the present inventors have found it possible to compress larger volumes of hydrogen gas at a reduced cost when compared with incumbent arrangements in the art that use reciprocating compression. Accordingly, the use of centrifugal compressors in the first section (where the volume of hydrogen gas is much larger than the later section(s)) is particularly beneficial. Centrifugal compressors also cost less to install and maintain and require a simpler foundation.

As mentioned above, centrifugal compression is not typically suited for compressing low molecular weight gases such as hydrogen gas (having a molecular weight of about 2.016 g/mol). However, in the context of the present invention the centrifugal compressors are employed for compressing hydrogen gas produced from electrolysis. Hydrogen gas received from electrolysis will be saturated with water vapour and so has a much higher apparent molecular weight than dry hydrogen gas, e.g. from around 2.45 to 3.05 g/mol.

The inventors have also realized that this hydrogen gas will have a higher apparent molecular weight in the first section of the compression system when compared with the further section. This is because the hydrogen gas has more and more water vapour removed as it moves through the compression system due to the inter-cooling between stages.

As such, the present inventors have found centrifugal compression to be particularly suitable for compressing hydrogen gas produced by electrolysis in the first section of the multistage compression system described herein, where the apparent molecular weight of the hydrogen gas is higher. This allows more efficient centrifugal compression due to the higher density of the gas establishing sufficient centrifugal force to provide compression.

In addition, the use of centrifugal compression requires far less space and a fewer number of compressors when compared with reciprocating compression. This also simplifies manufacturing since fewer stages are required to achieve the same pressure rise compared with reciprocating compressors.

The or each centrifugal compressor is powered by electricity generated at least in part from at least one renewable energy source. Preferably, the entire electricity demand for the compressor(s) in the first section of the multistage compression system is met using renewable energy sources. Suitable types of renewable energy source(s) are identical to those described above.

As mentioned above, the impeller speed (and thus the discharge pressure ratio) of the centrifugal compressors is susceptible to small variations in electrical frequency from the renewable energy source. Therefore, the or each centrifugal compressor is also driven by a dedicated variable frequency drive (VFD). Any variable frequency drive that is suitable for modulating an AC electrical signal, such as by conversion to a DC signal followed by the re-generation of an AC signal, to provide a stable frequency may be used. This can be accomplished by transistors acting as switches. Utilizing the switches allows the VFD to adjust the frequency that the VFD supplies to the motor of the centrifugal compressor, which in turn controls the rotor speed. Suitable types of VFDs include, but are not limited to, voltage source inverter (VSI), load commutated inverter (LCI), current source inverter (CSI), or a pulse width modulator-voltage source inverter (PWM-VSI).

By employing a variable frequency drive the inventors have found that the effects of variation in electrical frequency on the impeller speed of the centrifugal compressor are mitigated. This prevents drops in the discharge pressure of the hydrogen gas at the outlet of the first section. In addition, the use of a variable frequency drive saves power and is more energy efficient since it allows for the same level of motor performance but with less consumption of power.

Further Section of Compression

The further section is located downstream of the first section and is in fluid flow communication with the first section, i.e. the compressed hydrogen product from the outlet of the first section is fed to the inlet of the further section downstream.

The final elevated pressure of the compressed hydrogen gas produced by the further section of the multistage compression system will typically be at least a little higher than, or equal to, the desired feed pressure for the downstream process(es), e.g. typically from about 10 bar to about 50 bar. Preferably, the final elevated pressure of the compressed hydrogen gas is from about 25 bar to about 35 bar, more preferably is about 30 bar. In embodiments where the downstream process(es) includes the synthesis of ammonia, such as via the Haber (or Haber-Bosch) process, then the final elevated pressure is about 30 bar.

The further section may have one or more stages of compression that may be split between compressors in parallel and/or in series. The further section may comprise from 1 to 7, e.g. 2 to 4, stages of compression depending on the required pressure ratio.

The further section comprises at least one reciprocating compressor. Reciprocating compressors may be defined in terms of the number of "throws" or pistons running of a crankshaft. In some embodiments, the or each reciprocating compressor of the further section comprises from 4 to 12, preferably 6 to 10, throws.

The inventors have determined that, by using one or more reciprocating compressors in the further section instead of centrifugal compression, there is provided a more energy efficient and cost-effective way of compressing the cooled and/or purified hydrogen gas having a low molecular weight. There is also less space required for implementing said reciprocating compressor(s) of the further section compared with a system implementing centrifugal compressor(s), as explained above. Reciprocating compressors are also much more suitable for compressing smaller volumes of gas and so are particularly suited to the further section of the multistage compression system which contains later stages of compression with smaller volumes of gas.

Using reciprocating compressors in the further section is additionally advantageous since these are not susceptible to drops in discharge pressure due to the changes in apparent molecular weight of the hydrogen gas when it is further cooled (or purified).

Thus, there is no effect on discharge pressure where dry hydrogen gas is fed from storage or recycled.

Further, in contrast with centrifugal compression, reciprocating compressors do not experience drops in discharge pressure as a result of variations in electrical frequency.

Thus, ideally the or each reciprocating compressor in the further section is not driven by a variable frequency drive (VFD), saving costs. This is possible because the discharge pressure of reciprocating compressors is not related to, or dependent upon, the electrical frequency of the energy source used to power it. Where there are variations in electrical frequency, the discharge flow (typically measured as volume of gas per unit of time, e.g. $m^3/h$) of the output gas changes rather than the discharge pressure. Therefore, a further advantage of using reciprocating compressors in the further section is that this additionally maintains discharge pressure during changes in electrical frequency. This is particularly useful where a downstream process requires a stable feed pressure.

Hydrogen gas compressed using centrifugal compression in the first section is fed to the inlet of the reciprocating compressor(s) in the further section downstream.

As mentioned above, there are various factors which may affect the discharge pressure of the first section comprising one or more centrifugal compressors, such as gas molecular weight and electrical frequency. As a result, the hydrogen gas at the outlet of the first section may have a discharge pressure that is below the intended first elevated pressure (feed pressure) for the further section.

The present inventors have additionally realized that by using one or more reciprocating compressors in the further section, these slight drops in the discharge pressure of the centrifugal compressor(s) in the first section can be accommodated without affecting the final elevated pressure of the multistage compression system.

A drop in feed pressure to a reciprocating compressor does not result in a drop in the discharge pressure since the latter is not dependent upon the feed pressure of the gas. Rather, when there is a drop in feed pressure, this results in a drop in the discharge gas flow of the reciprocating compressor. This is in contrast to centrifugal compressors which have a discharge pressure that is dependent upon the feed pressure. Thus, the present inventors have surprisingly found that by following centrifugal compression with reciprocating compression, this remedies the drops in discharge pressure during centrifugal compression. This arrangement has therefore been found to be particularly suitable for a downstream process which requires a stable feed pressure.

Downstream Process(es)

The compressed hydrogen gas is consumed in a downstream process, or in more than one downstream process arranged in parallel.

A particular advantage of the present invention is that the compressed hydrogen gas is fed to the downstream process (es) at a stable feed pressure.

In the context of the present invention, the expression "stable feed pressure" in relation to hydrogen gas being fed to the downstream process(es) is used herein to refer to a pressure within about ±5%, preferably about ±2% of the desired feed pressure of the downstream process(es).

By way of an example, where the downstream process(es) involves the production of ammonia, such as via the Haber (or Haber-Bosch) process, the desired feed pressure may be 30 bar and a stable feed pressure may be any pressure from about 29.4 to about 30.6 bar.

The downstream process(es) could include any process that would currently use "grey" hydrogen or "blue" hydrogen. Such processes include oil refining and steel manufacture.

In preferred embodiments, at least some, e.g. all, of the compressed hydrogen is used to produce ammonia via the Haber (or Haber-Bosch) process. In this process, ammonia is produced by reacting a mixture of hydrogen and nitrogen gases over an iron-based catalyst at high temperature, typically at about 400° C. to about 500° C., and at high pressure, typically at a pressure in the range from about 100 bar to 200 bar.

In other embodiments, at least some, e.g. all, of the compressed hydrogen gas is liquefied by cryogenic cooling. In yet further embodiments, at least some, e.g. all, of the compressed hydrogen is used to produce methanol.

In still further embodiments, a first part of the compressed hydrogen gas is used to produce ammonia and a second part of the compressed hydrogen gas is liquefied.

The electricity required for the downstream process(es) may be generated from any suitable energy source. In some preferred embodiments however, at least some of the electricity required for the said downstream process(es) is generated from a renewable energy source including wind energy, solar energy, tidal energy and hydroelectric energy, or combinations of these sources, particularly wind energy and solar energy. The electricity generated from these sources may be used to provide power to the downstream process(es).

Return of Stored Hydrogen

One of the drawbacks of using electricity generated from a renewable energy source is the inherent fluctuations in the availability of the energy source. In some embodiments, this problem may be addressed in the present invention by providing a system for collecting and storing at least some, preferably all, of the excess hydrogen gas produced during periods when production exceeds demand from the downstream process(es), and distributing stored hydrogen gas to the downstream process(es) during periods when the demand exceeds production.

In some embodiments, the compressed hydrogen may be stored without further compression. In these embodiments, the gas is stored at a pressure up to a maximum pressure of the pressure to which the hydrogen is compressed in the multistage compression system, e.g. a pressure up to a maximum of about the feed pressure of the downstream process (where there is only one) or about the feed of one of the downstream processes (if there are more than one). In such embodiments, the compressed hydrogen may perhaps be stored at a pressure up to a maximum pressure in the region of about 25 bar to about 30 bar.

The compressed hydrogen may however be further compressed prior to storage. In these embodiments, compressed hydrogen gas may be stored at a pressure up to a maximum of about 200 bar, or up to a maximum of about 150 bar, or up to a maximum of about 100 bar, or up to a maximum of about 90 bar, or up to a maximum of about 80 bar, or up to a maximum of about 70 bar, or up to a maximum of about 60 bar, or up to a maximum of about 50 bar.

During periods when the level of demand for hydrogen exceeds the production level, compressed hydrogen gas is removed from storage and reduced in pressure to produce reduced pressure hydrogen gas. Pressure may be reduced in any conventional manner, particularly by passing the gas through a valve.

The pressure of the reduced pressure hydrogen gas will depend on the pressure at the point in the multistage compression system to which the reduced pressure hydrogen gas is to be added.

In some embodiments, reduced pressure hydrogen gas may be fed to the final stage in the further section of the multistage compression system. In these embodiments, the reduced pressure hydrogen gas will be at the inlet pressure of the feed to the final stage.

In other embodiments, reduced pressure hydrogen gas may be fed to an intermediate stage of the multistage compression system. In these embodiments, the reduced pressure hydrogen gas will be at the inlet pressure of the feed to the intermediate stage.

The intermediate stage may be an intermediate stage within the first section or the initial stage within the further section downstream of the first section. If there are more than two sections, the intermediate stage may be an initial stage within any additional section downstream of said further section. In these embodiments, the reduced pressure hydrogen gas will be at the inlet pressure of the feed to the section concerned, i.e. the "inter-section" pressure.

In still further embodiments, the reduced pressure hydrogen gas may be fed to the feed end, i.e. to the initial stage, of the multistage compression system. In these embodiments, the reduced pressure hydrogen gas will be the feed pressure to the multistage compression system, e.g. about 1.1 bar.

During periods when demand exceeds production, the method may comprise:
  reducing the pressure of the compressed hydrogen gas withdrawn from storage to produce reduced pressure hydrogen gas at the inlet pressure to a first stage of the multistage compression system (a first intermediate pressure); and
  feeding the reduced pressure hydrogen gas to the first stage.

In such embodiments, once the pressure of the compressed hydrogen gas in storage falls to about the inlet pressure of the first stage, the method may comprise:
  reducing further the pressure of the compressed hydrogen gas withdrawn from storage to produce reduced pressure hydrogen gas at an inlet pressure to a second stage of the multistage compression system upstream of the first stage (a second intermediate pressure); and
  feeding the reduced pressure hydrogen gas to the second stage.

It will be understood that the terms "first stage" and "second stage" in this context do not refer to the relative positions of the stages in the multistage compression system in the downstream direction during normal operation. In contrast, the terms are merely intended to reflect the order of the stages to which reduced pressure hydrogen gas is fed to the multistage compression system during periods when demand exceeds production. The terms "first intermediate pressure" and "second intermediate pressure" should be interpreted accordingly with the first intermediate pressure being higher than the second intermediate pressure.

These embodiments may further comprise feeding reduced pressure hydrogen gas to other stages of the multistage compression system upstream of the first and second stages. In these further embodiments, the pressure of the compressed hydrogen gas withdrawn from storage is reduced to the inlet pressure to the respective stages.

In some preferred embodiments, the second stage is the initial stage of the multistage compression system.

It will be appreciated that, in embodiments where reduced pressure hydrogen gas is fed to a second stage after the first stage, gas flow to the first stage is stopped when gas flow to the second stage starts. Generally speaking, flow of reduced pressure hydrogen gas to a given compression stage is stopped when flow of reduced pressure hydrogen gas to another compression stage starts.

In some preferred embodiments, wherein during feeding of said reduced pressure hydrogen gas to a stage, the or each centrifugal compressor upstream of said stage is operating such that no net compressed hydrogen gas is being produced.

Since hydrogen gas can be returned from storage to an intermediate stage and/or the initial stage in the first and/or further section of the multistage compression system, the compressed hydrogen gas may be stored at a pressure down to a minimum of about 5 bar, perhaps even down to a minimum of about 1.3 bar.

In embodiments in which compressed hydrogen gas is further compressed before being stored, another option would be for compressed hydrogen gas withdrawn from storage to be fed, after suitable pressure reduction, directly to the downstream process(es) until the storage pressure falls to the feed pressure of the downstream processes. At that point, the pressure of the compressed hydrogen gas withdrawn from storage would be reduced further and the reduced pressure hydrogen gas fed to a stage of the multistage compression system in accordance with the present invention. However, these embodiments are not preferred, e.g. because of the additional capital expense of the high-pressure storage system.

The term "suitable" in the context of pressure reduction is intended to mean that the pressure of the hydrogen gas is reduced to an appropriate extent having regard to the inlet pressure of the stage of the multistage compression system to which the reduced pressure hydrogen gas is fed.

Compared to a high-pressure hydrogen storage system with discharge only to the feed pressure of a downstream process, the present invention enables the storage volume of hydrogen to be reduced by using the multistage compression system that is already present in the process to recompress hydrogen from storage when the storage pressure drops below that feed pressure. The hydrogen can thereby continue to be taken from storage until the storage pressure falls to a minimum of the feed pressure to the multistage compression system.

Additional compression power is required during periods when hydrogen production is limited by lack of power to the electrolysers, but the additional compression power can be minimized by supplying hydrogen at the highest compressor inter-stage pressure possible given the storage pressure at a particular time. It also allows the maximum hydrogen storage pressure to be at or below the feed pressure of the downstream process to eliminate any additional compression requirement for hydrogen to storage.

It will be appreciated that the same volume of gas is stored in the same storage volume at the same maximum pressure and that reducing the minimum storage pressure increases the "releasable" volume of gas from storage, i.e. the usable volume of stored gas.

The inventors have, however, realized that where hydrogen is produced and then compressed in a multistage compression system for use in at least one downstream process, the releasable volume of stored hydrogen may be increased by returning hydrogen from storage to a stage in the multistage compression system rather than directly to the downstream process, and that this arrangement reduces the overall storage vessel volume required by the process.

By way of example, storage from a maximum pressure of 200 bar to a minimum pressure of 1.5 bar requires 15% less storage vessel volume for a given mass of releasable hydrogen compared to storage from a maximum pressure of 200 bar to a minimum pressure of 30 bar.

Similarly, storage from a maximum pressure of 100 bar to a minimum pressure of 1.5 bar requires 30% less storage vessel volume for a given mass of releasable hydrogen compared to storage from a maximum pressure of 100 bar to a minimum pressure of 30 bar.

In addition, storage from a maximum pressure of 50 bar to a minimum pressure of 1.5 bar requires 60% less storage vessel volume for a given mass of releasable hydrogen compared to storage from a maximum pressure of 50 bar to a minimum pressure of 30 bar.

Further, storage from a maximum pressure of 30 bar to a minimum pressure of 1.5 bar is feasible compared to 30 bar to 30 bar which would allow no storage.

Moreover, although the total storage vessel volume increases as the maximum storage pressure is reduced, the lower design pressure makes the vessel walls thinner and can reduce the overall capital cost of the storage system. The vessel thickness is often limited to a maximum value by considerations such as manufacturability, and in that case the lower design pressure will lead to fewer vessels (although each vessel will be larger). Furthermore, the allowable stress for the design of a vessel may be increased below a particular vessel wall thickness, and if the lower design pressure allows the thickness to be below this threshold, the total vessel metal mass (and therefore the total cost) can be reduced.

It will be appreciated that compressed hydrogen gas will have undergone steps of inter-cooling and after-cooling (and possibly purification, as the case may be) such that the reduced pressure hydrogen gas has little, or in fact no, water vapour content. The reduced pressure hydrogen gas will therefore have a low molecular weight, e.g. about 2.016 g/mol.

As mentioned above, centrifugal compression is less efficient when used to compress low molecular weight gases and so, where the hydrogen gas feed to the compressor is mixed with or replaced by hydrogen gas from storage, this may produce a discharge pressure which is lower than desired.

A particular advantage of the present invention is that there is no drop in the final elevated pressure when the reduced pressure hydrogen gas from storage is fed to any stage in the multistage compression system, since if it fed to a reciprocating compression stage in the further section, these types of compressors are unaffected by a drop in molecular weight of the feed gas.

Similarly, there is no drop in the final elevated pressure of the multistage compression system where reduced pressure hydrogen gas from storage is fed to any stage in the first section comprising one or more centrifugal compressors, since small drops in discharge pressure of the first section can be accommodated by the reciprocating compressors of the further section. This would not be possible in a multistage compression system where both the first and further section utilized centrifugal compression.

Apparatus

According to a second aspect of the present invention, there is provided an apparatus for supplying hydrogen gas for consumption in at least one downstream process, said apparatus comprising:
  a plurality of electrolysers for producing hydrogen gas;
  an electricity generation system for generating electricity from at least one renewable energy source;
  a multistage compression system for compressing hydrogen gas, said multistage compression system comprising a feed end, a first section, a further section downstream of said first section and an outlet end, said feed end being in fluid flow communication with said plurality of electrolysers;
  at least one downstream processing unit for consuming compressed hydrogen gas, said downstream processing unit(s) being in fluid flow communication with said outlet end of said multistage compression system;
wherein said multistage compression system is a hybrid system in which said first section comprises at least one centrifugal compressor and said further section comprises at least one reciprocating compressor, and wherein the or each centrifugal compressor is powered at least in part by electricity from said electricity generation system and driven by a dedicated variable frequency drive.

Electrolysers

The electrolysis of water is provided by a plurality of electrolysis units or "cells". Each unit or cell may be referred to as an "electrolyser".

The plurality of electrolysers typically has a total capacity of at least 1 GW. The maximum total capacity of the electrolysers is limited only by practical considerations, e.g. generating sufficient power from the renewable energy source(s) to power the plurality of electrolysers. Thus, the electrolysers may have a maximum total capacity of 10 GW or more. The total capacity of the electrolysers conducting the electrolysis may be from 1 GW to 5 GW, e.g. from about 1.5 GW to about 3 GW.

The plurality of electrolysers usually consists of a large number, e.g. hundreds, of individual cells combined into "modules" that also include process equipment, e.g. pumps, coolers, and/or separators, etc., and groups of these modules are typically arranged in separate buildings.

Each module typically has a maximum capacity of at least 10 MW, e.g. 20 MW, and each building typically has a total capacity of at least 100 MW, e.g. 400 MW.

Any suitable type of electrolyser may be used with the present invention. In this regard, there are three conventional types of electrolyser—alkaline electrolysers, PEM electrolysers and solid oxide electrolysers—and each of these types of electrolyser is in theory suitable for use with the present invention.

Alkaline electrolysers operate via transport of hydroxide ions ($OH^-$) through the electrolyte from the cathode to the anode with hydrogen being generated on the cathode side. Electrolysers using a liquid alkaline solution of sodium hydroxide or potassium hydroxide as the electrolyte are commercially available. Commercial alkaline electrolysers typically operate at a temperature in the range of about 100° C. to about 150° C.

In a PEM electrolyser, the electrolyte is a solid plastics material. Water reacts at the anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas. PEM electrolysers typically operate at a temperature in the range of about 70° C. to about 90° C.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit. Solid oxide electrolysers must operate at temperatures high enough for the solid oxide membranes to function properly, e.g. at about 700° C. to about 800° C.

Due to the lower operating temperatures, the use of alkaline electrolysers and/or PEM electrolysers are typically preferred.

The plurality of electrolysers may be arranged in at least two parallel groups. In these embodiments, the apparatus comprises:
a first header to collect hydrogen gas from each electrolyser in each group; and
a second header to collect hydrogen gas from the first headers and feed the hydrogen gas to the feed end of the multistage compression system;

In some embodiments wherein the apparatus further comprises a storage system for storing compressed hydrogen gas, the apparatus further comprises a conduit for feeding compressed hydrogen gas from a storage system after suitable pressure reduction to the second header.

Electricity Generation System for Compression

Electricity for compression is generated from at least one renewable energy source, e.g. wind energy and/or solar energy.

In embodiments in which wind energy is used to generate electricity, the electricity generation system will comprise a plurality of wind turbines. In embodiments in which solar energy is used to generate electricity, the electricity generation system will comprise a plurality of photovoltaic cells, or "solar cells".

Some embodiments will comprise a plurality of wind turbines and a plurality of photovoltaic cells.

The expression "electrically conductive communication" will be understood to mean that appropriate wires and/or cables will be used, together with any other relevant equipment, to connect the electricity generation system with the or each compressor in a safe and efficient manner.

In the context of the present invention, the or each centrifugal compressor is also driven by a dedicated variable frequency drive. Any variable frequency drive already mentioned herein which is suitable for modulating an AC electrical signal, such as by converting it to a DC signal before regenerating an AC signal, to provide a stable electrical frequency, may be used.

In some preferred embodiments, the electricity generation system also generates electricity for electrolysis.

Multistage Compression System

As mentioned above, the multistage compression system comprises a plurality of stages typically having a compression ratio in the range of about 2 to about 2.5. Inter-coolers are typically provided between adjacent stages, and after-coolers may be required after a final stage.

The stages of a multistage compression system are also arranged in at least two compression sections, a first and a further section downstream of said first section.

The first section comprises at least one centrifugal compressor powered by electricity generated at least in part from at least one renewable energy source, the or each centrifugal compressor being driven by a dedicated variable frequency drive. The further section comprises at least one reciprocating compressor, preferably also powered by electricity generated at least in part from at least one renewable energy source.

Each section may comprise one or more stages of compression, together with the associated coolers. Phase separators may also be included upstream of each compression stage to remove liquids from the hydrogen gas to be compressed. For LP centrifugal compressors, the phase separator will usually be combined into the intercooler as a single unit to potentially enable capital and power benefits and simplify the system.

In particular embodiments, the multistage compression system has two sections, a first (low pressure or "LP") section in which hydrogen gas is compressed from the feed pressure to the multistage compression system to a first elevated pressure, and a further (medium pressure or "MP") section in which hydrogen gas is compressed from the first elevated pressure to the final elevated pressure desired for the downstream process(es).

An LP section may have one or more, e.g. two, stages of compression and an MP section may have one or more, e.g. 2 or 3, stages of compression.

By way of example, for a process having a total electrolysers capacity of 1 GW, the multistage compression system may have from 5 to 15 compressors, e.g. from 7 to 13 compressors or from 9 to 11 compressors, as required. The skilled person would appreciate that a process having a higher total capacity would require a greater number of compressors.

Compressors in an LP section may be oversized as appropriate, e.g. by 10%, to accommodate the loss of a machine. Additionally or alternatively, the multistage compression system may comprise a spare compressor in either the LP or an MP section which would cut-in to replace another machine in the relevant section that had broken down.

Purification System

In some embodiments where there is a downstream process(es) that cannot tolerate the levels of water and oxygen inherently present in the compressed hydrogen gas produced by the electrolysis of water, the apparatus may comprise a purification system in which the compressed hydrogen gas is purified.

The purification system will typically comprise a "DeOxo" unit in which oxygen is removed by the catalytic combustion of hydrogen to produce water and oxygen-depleted compressed hydrogen gas.

The oxygen-depleted gas may then be dried in a drier, e.g. an adsorption unit, such as a temperature swing adsorption (TSA) unit, to produce dry compressed hydrogen gas for the downstream process(es).

Downstream Processing Unit(s)

In some embodiments there may be a downstream processing unit(s). A downstream processing unit may be any unit that utilizes hydrogen gas as a feedstock.

Examples of suitable downstream processing units include an oil refinery, a steel manufacturing facility, an ammonia synthesis plant or a hydrogen liquefaction plant. In some embodiments, there is both an ammonia synthesis plant and a hydrogen liquefaction plant arranged in parallel.

In particularly preferred embodiments the downstream processing unit(s) includes an ammonia synthesis plant, e.g.

using the Haber (Haber-Bosch) process, or alternatively, a methanol synthesis plant, e.g. using $CO_2$ hydrogenation.

Control System

In some embodiments the apparatus comprises a control system that controls not only the pressure and flow of compressed hydrogen from the multistage compression system to the storage system, e.g. during periods when hydrogen production exceeds demand, but also the pressure and flow of compressed hydrogen gas to the multistage storage system, e.g. during periods when hydrogen demand exceeds production.

In some embodiments, the control system would simply seek to maintain the pressure of hydrogen gas in a downstream header to the downstream process. Thus, in order to continually provide a given amount of hydrogen to the downstream process, a pressure controller would be maintained on a discharge header that feeds the downstream process.

If the pressure in the discharge header exceeded the required feed pressure (e.g. because there is more hydrogen available than the downstream process is consuming), the pressure would be relieved by opening a valve in the feed line to storage.

Once the pressure in the discharge header dropped to the required feed pressure, the valve in the feed line to storage would be closed.

If the pressure in the discharge header dropped below the required feed pressure (e.g. because there is less hydrogen available than the downstream process is consuming), the pressure would be increased by opening a valve in a first return line from storage to a first stage in the multistage compression system.

The valve in the first return line would remain open until such time that the pressure in the discharge header exceeded the required feed pressure, indicating that the level of hydrogen production has returned to the required level, at which point the valve would be closed, or until the pressure in the storage vessel drops to about the inlet pressure to the first stage of multistage compression system being fed by the first return line.

In the latter case, not only would the valve in the first return line be closed, but also a valve in a second return line from storage to a second stage in the multistage compression system (upstream of the first stage) would be opened so as to continue to feed hydrogen from storage back to the downstream process.

Such a control system may be referred to as a "split range" control system.

Storage System

In some embodiments, the apparatus comprises a hydrogen gas storage system for storing compressed hydrogen gas. In such embodiments, the storage system is in fluid flow communication with the outlet end of the multistage compression system and at least one compression stage of the multistage compression system.

The storage system typically comprises a number of pressure vessels and/or pipe segments connected to a common inlet/outlet header.

The pressure vessels may be spheres, e.g. up to about 25 m in diameter, or "bullets", i.e. horizontal vessels with large L/D ratios (typically up to about 12:1) with diameters up to about 12 m.

Salt domes may also be used if the geology of the site allows.

Water Source

Any suitable source of water may be used with the present invention. However, in embodiments in which sea water is used to produce the water for the electrolysis, the apparatus would further comprise at least one unit (or plant) for desalination and demineralization of the sea water.

Aspects

Aspects of the invention include:
1. A process for supplying hydrogen for consumption in at least one downstream process, said process comprising:
  producing hydrogen gas by electrolysis of water;
  compressing said hydrogen gas in a multistage compression system comprising a first section and a further section downstream of said first section to produce compressed hydrogen gas; and
  feeding said compressed hydrogen gas to said downstream process(es),
wherein said first section of said multistage compression system comprises at least one centrifugal compressor powered by electricity generated at least in part from at least one renewable energy source, the or each centrifugal compressor being driven by a dedicated variable frequency drive, and wherein said further section of said multistage compression system comprises at least one reciprocating compressor.
  2. The process according to #1, wherein at least some of the compressed hydrogen gas is used to produce ammonia in the downstream process(es).
  3. The process according to #1, wherein within said first section hydrogen gas is compressed to a first elevated pressure, and wherein within said further section compressed hydrogen gas is further compressed to a further elevated pressure.
  4. The process according to #1, wherein the multistage compression system has two sections, and in the first section hydrogen gas is compressed to a first elevated pressure, and within the second section compressed hydrogen gas is further compressed to a final elevated pressure.
  5. The process according to #1, wherein said hydrogen gas is fed to said multistage compression system at a feed pressure from atmospheric pressure to 3 bar, preferably from atmospheric pressure to 1.5 bar.
  7. The process according to #1, wherein said compressed hydrogen gas produced by said multistage compression system has a pressure from 10 bar to 50 bar.
  8. The process according to #1, wherein said first section comprises from 1 to 4 stages of centrifugal compression, and said further section comprises from 1 to 7 stages of reciprocating compression.
  9. The process according to #1, wherein said first section comprises from 1 to 7 centrifugal compressors arranged in parallel, and said further section comprises from 1 to 5 reciprocating compressors arranged in parallel.
  10. The process according to #1, wherein during periods when more hydrogen gas is produced by said electrolysis than is required for said downstream process(es), said method comprises feeding excess compressed hydrogen gas to storage, optionally after further compression; and wherein during periods when more hydrogen gas is required for said downstream process(es) than is produced by said electrolysis, said method comprises withdrawing compressed hydrogen gas from storage and, after suitable pressure reduction, feeding said reduced pressure hydrogen gas to an inter-stage of said first section or an initial stage of said further section of said multistage compression system.

11. The process according to #10, wherein during said periods when more hydrogen gas is required for said downstream process than is produced by said electrolysis, said method comprises:
   reducing the pressure of said compressed hydrogen gas withdrawn from storage to produce reduced pressure hydrogen gas at the inlet pressure to a stage in the first or further section of said multistage compression system; and
   feeding said reduced pressure hydrogen gas to said stage.

12. The process according to #11, wherein during feeding of said reduced pressure hydrogen gas to said stage, each centrifugal compressor upstream of said stage is operating such that no net compressed hydrogen gas is being produced.

13. The process according to #1, wherein said electrolysis has a total capacity of at least 300 MW.

14. An apparatus for supplying hydrogen gas for consumption in at least one downstream process, said apparatus comprising:
   a plurality of electrolysers for producing hydrogen gas;
   an electricity generation system for generating electricity from at least one renewable energy source;
   a multistage compression system for compressing hydrogen gas, said multistage compression system comprising a feed end, a first section, a further section downstream of said first section and an outlet end, said feed end being in fluid flow communication with said plurality of electrolysers;
   at least one downstream processing unit for consuming compressed hydrogen gas, said downstream processing unit(s) being in fluid flow communication with said outlet end of said multistage compression system;
wherein said multistage compression system is a hybrid system in which said first section comprises at least one centrifugal compressor and said further section comprises at least one reciprocating compressor, and
wherein the or each centrifugal compressor is powered at least in part by electricity from said electricity generation system and driven by a dedicated variable frequency drive.

15. The apparatus according to #14, comprising:
   a storage system for storing compressed hydrogen gas, said storage system being in fluid flow communication with said outlet end of said multistage compression system and at least one compressor of said multistage compression system; and
   a control system for controlling pressure and flow of compressed hydrogen gas from said multistage compression system to said storage system and for controlling pressure and flow of compressed hydrogen gas from said storage system to said multistage compression system based on the level of production of hydrogen gas by said electrolysers and/or the demand of the downstream process(es).

BRIEF DESCRIPTION OF THE FIGURES

The invention will now be described by example only and with reference to the FIGURES in which:

FIG. 1 is a simplified flowsheet for an example of the present invention.

FIG. 1 shows a multistage compression system having a first section with two LP centrifugal compression stages 12 and 15, and a further section with two MP reciprocating compression stages 19 and 22.

Feed 1 contains hydrogen gas supplied from electrolysers, which is fed through phase separator 11 to remove liquid water to produce feed 2. Feed 2 is then fed to the centrifugal compression stage 12 in the first (LP) section for compression. Following compression, the hot compressed hydrogen gas is cooled in intercooler 13 using a cooling water stream before it is then fed through phase separator 14 to produce feed 3. Although shown separately in FIG. 1, for LP centrifugal compressors, the phase separator will usually be combined into the intercooler as a single unit to potentially enable capital and power benefits and simplify the system.

At this point, feed 3 may optionally be mixed with, or entirely replaced by (as the case may be), stream 9 which contains dry hydrogen gas from storage. The mixed hydrogen gas feed 4 is then fed to a second centrifugal compression stage 15 in the first (LP) section. Following compression, the hot compressed hydrogen gas is cooling in intercooler 16 before being passed through phase separator 17 to produce feed 5.

Feed 5 is then optionally mixed with, or entirely replaced by (as the case may be) stream 10 which contains dry hydrogen gas from storage, to produce mixed feed 6.

Feed 6 is then fed to reciprocating compression stage 19 in a further (MP) section. Following compression, the hot compressed hydrogen gas is cooled in intercooler 20 before being passed through phase separator 21 and subsequently fed to reciprocating compression stage 22 in the further (MP) section to produce feed 8 containing compressed hydrogen at a final elevated pressure (which is the desired feed pressure for the downstream process(es)). Feed 8 will then be optionally purified and fed to at least one downstream process for consumption.

Streams 24, 26, 28, 30 and 32 feed gas to and from compressors in parallel (not shown).

The system depicted in FIG. 1 will now be explained in more detail with reference to the following Examples which contain data generated by computer simulation (Aspen Plus, ver. 10). The following Examples serve to illustrate the ways in which the hybrid multistage compression system of the present invention is resistant to changes in molecular weight of the hydrogen gas feed.

Example 1

| | | Example 1 | | | | | | |
|---|---|---|---|---|---|---|---|---|
| | | 1 | 2 | 5 | 6 | 7 | 8 | 10 |
| Wet Mass Flowrate | kg/h | 49341.5 | 9868.3 | 7029.6 | 35148.1 | 11716.0 | 10749.0 | 0.0 |
| Wet Volumetric Flowrate | m³/h | 348176.0 | 71407.6 | 16316.8 | 84059.9 | 28337.3 | 5323.5 | 0.3 |

-continued

| | | Example 1 | | | | | | |
|---|---|---|---|---|---|---|---|---|
| | | 1 | 2 | 5 | 6 | 7 | 8 | 10 |
| Wet Molar Flow | Nm³/h | 362011.6 | 72402.3 | 68870.3 | 344353.2 | 114784.4 | 113581.1 | 0.0 |
| Pressure | bara | 1.22 | 1.19 | 6.32 | 6.25 | 6.18 | 30.20 | 6.25 |
| Temperature | deg C. | 42.00 | 42.00 | 40.00 | 40.00 | 40.00 | 106.09 | 40.00 |
| Molecular Weight | | 3.05 | 3.05 | 2.29 | 2.29 | 2.29 | 2.12 | 2.02 |

Example 1 shown in the table above describes the properties of feeds/streams 1 to 10 at various points in a multistage compression system which is compressing hydrogen gas produced by electrolysis to be fed to a downstream process which has a desired feed pressure of 30 bar.

In this Example the multistage compression system is operating with feed 1 (the wet hydrogen gas from the electrolysers) at full flow. This may be because there is enough electricity available from the renewable energy source used to power electrolysis and/or all of the compressors in the compression system. Thus, under these conditions no reduced pressure hydrogen is required to be fed to the system from storage via streams 9 or 10.

It can be seen that the discharge pressure at the outlet of the further (MP) section (i.e. feed 8) is the required ~30 bar. This system is resistant to changes in the electrical frequency of the renewable energy source that powers the compressors. It can also be seen that despite the reduction in molecular weight as the hydrogen gas is compressed in subsequent stages, the MP reciprocating compressors still manage to output a discharge pressure of ~30 bar. This is possible as reciprocating compressors are unaffected by the reduction in molecular weight, this would not the be case if these were replaced with centrifugal compressors.

Example 2 has a molecular weight of 2.02. It can be seen that since said dry hydrogen gas from stream 10 is being compressed only in reciprocating compressors 19 and 22, there is no drop in the discharge pressure of the multistage compression system as a result of the reduced molecular weight of the hydrogen gas. As such, the multistage compression system provides compressed hydrogen gas with a final elevated pressure of 30 bar suitable for feeding to the downstream process.

The present inventors found that a stable output pressure under all conditions would not be possible if the MP reciprocating compressors were replaced with MP centrifugal compressors.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

In this specification, unless expressly otherwise indicated, the word "or" is used in the sense of an operator that returns a true value when either or both of the stated conditions are met, as opposed to the operator "exclusive or" which

| | | Example 2 | | | | | | |
|---|---|---|---|---|---|---|---|---|
| Stream | | 1 | 2 | 5 | 6 | 7 | 8 | 10 |
| Wet Mass Flowrate | kg/h | 0 | Min* | Min* | 22788.77 | 7596.281 | 7596.281 | 22788.77 |
| Wet Volumetric Flowrate | m³/h | 0 | Min* | Min* | 45423.15 | 15620.3 | 4304.223 | 45423.15 |
| Wet Molar Flow | Nm³/h | 0 | Min* | Min* | 253367 | 84455.91 | 84455.91 | 253367 |
| Pressure | bara | 1.2 | 1.2 | 6.2 | 6.5 | 6.3 | 30 | 6.5 |
| Temperature | deg C. | 42 | 42 | 40 | 40 | 40 | 133.96 | 40 |
| Molecular Weight | | 3.05 | 3.05 | 2.02 | 2.02 | 2.02 | 2.02 | 2.02 |

*= minimum flow (recycle)

Example 2 shown in the table above also describes the properties of feeds/streams 1 to 10 at various points in a multistage compression system which is compressing hydrogen gas produced by electrolysis to be fed to a downstream process which has a desired feed pressure of 30 bar.

In this Example the multistage compression system is operating with feed 1 (the wet hydrogen gas from the electrolysers) at zero flow. This may be because there is not enough electricity available from the renewable energy source used to power electrolysis and/or all of the compressors in the compression system.

Thus, under these conditions 100% of the hydrogen gas for compression in stream 6 is reduced pressure hydrogen gas fed from storage via stream 10 to the first stage of the further (MP) section. Again, the reduced pressure hydrogen gas in stream 10 has been cooled and purified and therefore requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for supplying hydrogen for consumption in at least one downstream process, said process comprising:
   producing hydrogen gas by electrolysis of water;
   compressing said hydrogen gas in a multistage compression system comprising a first section and a further section downstream of said first section to produce compressed hydrogen gas; and feeding said compressed hydrogen gas produced via the multistage compression system to said downstream process(es), wherein said first section of said multistage compression system comprises at least one centrifugal compressor powered by electricity generated at least in part from at least one renewable energy source, a cooler to cool the hydrogen gas compressed via the centrifugal compressor and a phase separator to remove liquid from the hydrogen gas compressed via the centrifugal compressor, each centrifugal compressor being driven by a dedicated variable frequency drive to adjust a frequency that the variable frequency drive supplies to a motor of the centrifugal compressor to prevent a drop in discharge pressure at an outlet of the first section, and wherein said further section of said multistage compression system comprises at least one reciprocating compressor to maintain a discharge pressure at an outlet of the further section during changes in electrical frequency.

2. The process according to claim 1, wherein at least some of the compressed hydrogen gas is used to produce ammonia in the downstream process(es).

3. The process according to claim 1, wherein within said first section hydrogen gas is compressed to a first elevated pressure, and wherein within said further section compressed hydrogen gas is further compressed to a further elevated pressure.

4. The process according to claim 1, wherein the multistage compression system has two sections, and in the first section hydrogen gas is compressed to a first elevated pressure, and within the second section compressed hydrogen gas is further compressed to a final elevated pressure.

5. The process according to claim 1, wherein said hydrogen gas is fed to said multistage compression system at a feed pressure from atmospheric pressure to 3 bar.

6. The process according to claim 1, wherein said compressed hydrogen gas produced by said multistage compression system has a pressure from 10 bar to 50 bar.

7. The process according to claim 1, wherein said first section comprises from 1 to 4 stages of centrifugal compression, and said further section comprises from 1 to 7 stages of reciprocating compression.

8. The process according to claim 1, wherein said first section comprises from 1 to 7 centrifugal compressors arranged in parallel, and said further section comprises from 1 to 5 reciprocating compressors arranged in parallel.

9. The process according to claim 1, wherein during periods when more hydrogen gas is produced by said electrolysis than is required for said downstream process (es), said method comprises feeding excess compressed hydrogen gas to storage, optionally after further compression; and wherein during periods when more hydrogen gas is required for said downstream process(es) than is produced by said electrolysis, said method comprises withdrawing compressed hydrogen gas from storage and, after suitable pressure reduction, feeding said reduced pressure hydrogen gas to an inter-stage of said first section or an initial stage of said further section of said multistage compression system.

10. The process according to claim 9, wherein during said periods when more hydrogen gas is required for said downstream process than is produced by said electrolysis, said method comprises:

reducing the pressure of said compressed hydrogen gas withdrawn from storage to produce reduced pressure hydrogen gas at the inlet pressure to a stage in the first or further section of said multistage compression system; and feeding said reduced pressure hydrogen gas to said stage.

11. The process according to claim 10, wherein during the feeding of said reduced pressure hydrogen gas to said stage, each centrifugal compressor upstream of said stage is operating such that no net compressed hydrogen gas is being produced.

12. The process according to claim 1, wherein said electrolysis has a total capacity of at least 300 MW.

13. The process of claim 1, wherein said downstream process(es) include steel manufacturing, methanol production, and/or oil refining.

14. The process of claim 1, wherein said hydrogen gas is fed to said multistage compression system at a feed pressure from atmospheric pressure to 1.5 bar.

15. The process of claim 1, wherein the dedicated variable frequency drive adjusts the frequency that the variable frequency drive supplies to the motor of the centrifugal compressor to control a rotor speed of the centrifugal compressor to prevent the drop in discharge pressure at the outlet of the first section.

16. The method of claim 1, wherein the compressing of said hydrogen gas in the multistage compression system includes:

compressing said hydrogen gas via the first section by compressing the hydrogen gas in the at least one centrifugal compressor of the first section, cooling the hydrogen gas compressed via the at least one centrifugal compressor of the first section via a cooler of the first section, and passing the cooled hydrogen gas through a phase separator of the first section to remove liquid from the hydrogen gas compressed via the at least one centrifugal compressor of the first section before the hydrogen gas compressed via the at least one centrifugal compressor is fed to the further section, the compressing of the hydrogen gas via the first section being performed such that water vapor within the hydrogen gas fed to the first section is removed from the hydrogen gas before the hydrogen gas is fed to the further section; and feeding the hydrogen gas compressed via the at least one centrifugal compressor to the further section to be further compressed after the hydrogen gas is output from the first section.

17. An apparatus for supplying hydrogen gas for consumption in at least one downstream process, said apparatus comprising:

a plurality of electrolysers for producing hydrogen gas;

an electricity generation system for generating electricity from at least one renewable energy source;

a multistage compression system for compressing hydrogen gas, said multistage compression system comprising a feed end, a first section, a further section downstream of said first section and an outlet end, said feed end being in fluid flow communication with said plurality of electrolysers;

at least one downstream processing unit for consuming compressed hydrogen gas output from the outlet end of the multistage compression system, said downstream processing unit(s) being in fluid flow communication with said outlet end of said multistage compression system;

wherein said multistage compression system is a hybrid system in which said first section comprises at least one centrifugal compressor, a cooler to cool the hydrogen gas compressed via the at least one centrifugal compressor and a phase separator to remove liquid from the hydrogen gas compressed via the at least one centrifugal compressor, and said further section comprises at least one reciprocating compressor to maintain a discharge pressure at the outlet end of said multistage compression system during changes in electrical frequency, and wherein each centrifugal compressor is powered at least in part by electricity from said electricity generation system and is driven by a dedicated variable frequency drive configured to adjust a frequency that the variable frequency drive supplies to a motor of the centrifugal compressor to prevent a drop in discharge pressure at an outlet of the first section.

18. The apparatus according to claim 17, comprising:

a storage system for storing compressed hydrogen gas, said storage system being in fluid flow communication with said outlet end of said multistage compression system and at least one compressor of said multistage compression system; and a control system for controlling pressure and flow of compressed hydrogen gas from said multistage compression system to said storage system and for controlling pressure and flow of compressed hydrogen gas from said storage system to said multistage compression system based on the level of production of hydrogen gas by said electrolysers and/or the demand of the downstream process(es).

19. The apparatus of claim 17, wherein the dedicated variable frequency drive is configured to adjust the frequency that the variable frequency drive supplies to the motor of the centrifugal compressor to control a rotor speed of the centrifugal compressor to prevent the drop in discharge pressure at the outlet of the first section.

* * * * *